United States Patent [19]

Farag et al.

[11] 4,241,093

[45] Dec. 23, 1980

[54] FOOD SUPPLEMENT FROM VEGETABLE PULP AND METHOD OF PREPARING SAME

[75] Inventors: Souly A. Farag, Moses Lake; John E. Hayes, Seattle, both of Wash.; Lloyd W. Norman, Wahpeton, N. Dak.

[73] Assignee: U and I, Incorporated, Salt Lake City, Utah

[21] Appl. No.: 905,059

[22] Filed: May 11, 1978

[51] Int. Cl.$^2$ ............................................ A23L 1/277
[52] U.S. Cl. .................... 426/258; 426/259; 426/640; 426/431
[58] Field of Search ............... 426/253, 256, 257, 258, 426/259, 429, 431, 640, 658; 162/72, 80

[56] References Cited

U.S. PATENT DOCUMENTS

| | | | |
|---|---|---|---|
| 345,159 | 7/1886 | Maul | 426/259 |
| 2,367,771 | 1/1945 | Hampel | 162/80 |
| 2,430,674 | 11/1947 | Hampel | 426/253 |
| 3,574,634 | 4/1971 | Singer | 426/804 |
| 3,676,150 | 7/1972 | Glicksman et al. | 426/804 |
| 3,928,121 | 12/1975 | Castillo | 426/431 |
| 3,998,976 | 12/1976 | Pernod | 426/804 |

*Primary Examiner*—Jeanette M. Hunter
*Attorney, Agent, or Firm*—Criddle & Western

[57] ABSTRACT

A bland food supplement which can be used as a filler, extender, or protein binder in a variety of food products is made from water-extracted vegetable pulp such as sugar beet pulp. The pulp is contacted with an aqueous bleaching solution selected from the group consisting of hydrogen peroxide, an alkali metal peroxide, ammonium persulfate, sulfur dioxide, sodium hydrosulfite, sodium chlorite, sodium hypochlorite, chlorine, chlorine dioxide and combinations thereof. The bleached pulp is separated from the bleaching solution, and is then dried to obtain a stable, free-flowing, food supplement comprising about 4% to 8% by weight water, about 7% to 9% crude protein, about 15% to 25% crude fiber, about 60% to 70% nitrogen-free extracts, and about 2.5% to 5% ash.

10 Claims, 1 Drawing Figure

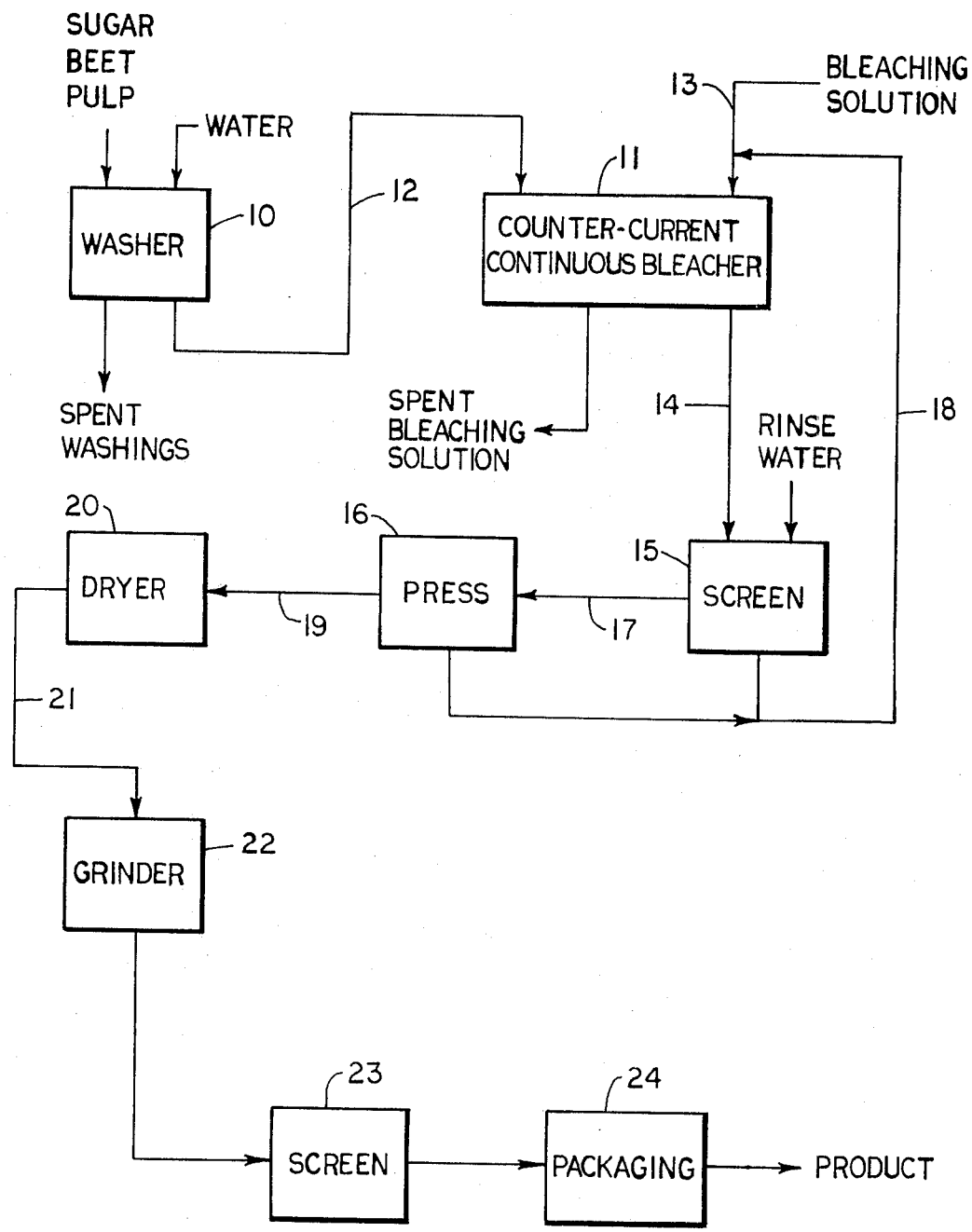

FOOD SUPPLEMENT FROM VEGETABLE PULP AND METHOD OF PREPARING SAME

BACKGROUND OF THE INVENTION

1. Field

The invention pertains broadly to the recover of edible food values from processed vegetable pulps. As used throughout the specification and claims, the term "processed vegetable pulps" is meant to include pulp from any vegetable or fruit.

2. State of the Art

In the typical processing of water extractable vegetables, such as sugar beets, the vegetable matter is cleaned, sliced, and contacted with hot water to yield an extract of water soluble components which are recovered for their sugar content or other extracted componenets and a depleted water insoluble pulp. In the processing of sugar beets, the wet pulp is conventionally pressed, blended with molasses and/or concentrated filtrate from the refining of the extract, and dried to form a material which is used as an animal feed.

SUMMARY OF THE INVENTION

In accordance with the present invention, a bland, light-colored food supplement is produced from water-extracted vegetable pulp. Vegetable pulps which are particularly adaptable include those of sugar beets, apples, citrus peels, corn, beans, peas, and turnips.

The water-extracted pulp is subjected to a particular sequence of process steps. In the sequence, pulp is contacted with an aqueous bleaching solution comprising a bleaching agent selected from the group consisting of hydrogen peroxide, an alakli metal peroxide, ammonium persulfate, sulfur dioxide, sodium hydrosulfite, sodium chlorite, sodium hypochlorite, chlorine, chlorine dioxide and combinations thereof. The bleached pulp is separated from the bleaching solution, and the pulp is then dried to produce a stable, free-flowing food supplement which can be used as a filler, extender, or protein binder in a variety of food products.

In a typical sugar beet process, sugar beets are cut into pieces, and the pieces are contacted with hot water to produce an extract of water soluble components and water insoluble pulp. The water insoluble pulp is then separated from the extract and conventionally disposed of as waste or, as mentioned above, made into an animal feed. This pulp, however, is converted into a desirable food supplement by the process of this invention. The pulp is advantageously washed with water prior to the bleaching step of the above sequence of the present invention.

A bland, free-flowing food supplement is produced which quickly swells in hot or cold aqueous systems, thereby creating a filling and thickening material usable in a number of food products such as soups, sauces, gravies, dips, extruded seafoods, "high fiber" bread, batter and breaded products. In the powdered form, the product is completely suited for dry instant mixes and imitation fruit drinks.

THE DRAWING

A particular embodiment of the present invention representing the best mode presently contemplated of carrying out the invention is illustrated in the accompanying drawing, in which the single FIGURE is a schematic flow sheet of the process as applied to sugar beet pulp.

DETAILED DESCRIPTION OF THE ILLUSTRATED EMBODIMENT

As illustrated, water-extracted sugar beet pulp is washed with water in washer 10. The spent wash water is discarded, and the washed, extracted, sugar beet pulp is forwarded from washer 10 to a bleaching unit 11 via conduit 12. The extracted beet pulp is contacted with an aqueous bleaching agent in the bleaching unit 11. The bleaching solution is selected from a group which comprises hydrogen peroxide, sodium peroxide, ammonium persulfate, sulfur dioxide, sodium hydrosulfite, sodium chlorite, sodium hypochlorite, chlorine, chlorine dioxide, and combinations thereof. Hydrogen peroxide is particularly advantageous for commercial use because it is inexpensive, readily available, and very effective. The concentration of the bleaching solution can range from about 0.5% to about 35% by weight, with more rapid bleaching occurring, as to be expected, using the more concentrated solutions. However, for economic reasons, it is desirable to minimize the bleaching agent concentration to maximize the economic efficiency of the process. Accordingly, bleaching agent concentrations of from about 0.5 to about 2% have been found to be very effective and economically preferable.

In a preferred mode of operation, the bleaching unit 11 is operated in countercurrent fashion. Concentrated food grade hydrogen peroxide is mixed with hot water at about 60° to about 80° C., and the diluted mixture is fed via conduit 13 to the bleaching unit 11. The bleaching solution passed through the bleaching unit is opposite direction to the beet pulp.

The bleaching unit 11 is designed to provide for adequate retention time for the beet pulp. Proper retention time depends on the temperature of the bleaching solution, and, although temperatures as low as room temperature can be employed, the retention time can be minimized by maintaining a temperature of from about 60° to about 90° C. Preferably, temperatures of from about 60° to about 80° C. are employed thereby minimizing vaporization in the bleaching unit 11. At temperatures between about 60° and about 80° C., thirty minutes to an hour or thereabouts has been found to be sufficient retention in the bleaching solution. Longer retention times can be employed as desired. Some improvement in the texture of the treated pulp may result from using somewhat longer retention times. Increased concentrations of the bleaching agent will, of course, hasten the bleaching reaction in bleaching unit 11, thereby reducing the residence time of the beet pulp therein while simultaneously producing a treated pulp having good texture. As mentioned above, however, economics of the process as a whole must be considered under localized conditions in which the process is being used in maximizing the concentration of bleaching agent.

The treatment with the bleaching agent can also be carried out batch-wise in a conventional agitated vessel. In such batch treatments, it has been found advantageous to dilute the bleaching agent such that the aqueous bleaching solution is used in an amount of up to about three times the weight or pressed beet pulp to allow effective mixing. The residence time in the batch treatment is also dependent upon the temperature and concentration of the bleaching agent. Generally, temperatures of between about 40° C. and 80° C. and concentrations of bleaching agent of from about 0.5 to 35% by weight have been found adequate. Using temperatures between 60° C. and 80° C., with a bleaching agent concentration of about 1% by weight produces good results, with retention times of from 30 to 60 minutes.

The pressed pulp can also be treated by spraying it with a concentrated solution (20% to 50% by weight) of the bleaching agent instead of the batch mixing step described above or the countercurrent, continuous treatment as illustrated in the drawing. The spray bleaching technique minimizes the consumption of water, and is efficient provided there is an intimate contact between beet pulp and the spray.

Following the contact with the bleaching solution, the beet pulp is drained and rinsed with water. As illustrated in the drawing, the bleached pulp is forwarded from the bleaching unit 11 via conduit 14 to screen 15 wherein it is rinsed with rinse water. The rinsed pulp is fed to press 16 via conduit 17. Residual water from the press 16 is recycled with the rinse water from screen 15 via conduit 18 to be mixed with the bleaching solution feed to the bleaching unit 11. The recycled water in conduit 18 is advantageously heated to a temperature of up to about 80° C. prior to being mixed with the bleaching solution and fed to the bleaching unit 11.

The rinsed beet pulp is forwarded to dryer 20 via conduit 19, and the bleached pulp is dried to obtain a free-flowing easily handled product. The drying can be accomplished in any conventional drying apparatus, including drum heat dryers, vacuum dryers, and freeze dryers.

The dried pulp is then fed to grinder 22 by conveyer 21. The dried product may be ground to any particle size desired in order to achieve a uniform product. The bland, near-white, ground product is then screened on screen 23 and conveyed to a packaging station 24 wherein it is packaged for shipment to ultimate users.

The food supplement produced in accordance with this invention comprises from about 4% to 8% moisture, from about 7% to 9% crude protein, from about 15% to 25% crude fiber, about 60% to 70% nitrogen-free extracts, and about 2.5% to 5% ash. The dried product quickly swells in hot or cold aqueous systems to create filling material usable in a number of food products such as soups, sauces, gravies, dips, extruded seafoods, "high fiber" bread, batter and breaded products. The powdered, dry product is also useful for use in dry instant mixes, and can be made into an ideal imitation fruit drink base.

We claim:

1. A process for producing a bland food supplement from water-extracted, vegetable pulp selected from the group consisting of the water-extracted pulps of sugar beets, apples, citrus peels, corn, beans, peas, and turnips, said process comprising the steps of:
    (a) contacting the water-extracted pulp with an aqueous bleaching solution comprising a bleaching agent selected from the group consisting of hydrogen peroxide, an alkali metal peroxide, ammonium persulfate, sulfur dioxide, sodium hydrosulfite, sodium chlorite, sodium hypochlorite, chlorine, chlorine dioxide, and combinations thereof,
    (b) separating the bleached pulp from the bleaching solution, and
    (c) drying the bleached pulp to obtain a stable, free-flowing, bland food supplement having a composition by weight of about 4% to 8% water, about 7% to 9% crude protein, about 15% to 25% crude fiber, about 60% to 70% nitrogen-free extracts, and about 2.5% to 5% ash, wherein said food supplement can be used as a filler, extender, or protein binder in a variety of food products.

2. A process in accordance with claim 1, wherein the vegetable pulp is water-extracted sugar beet pulp.

3. A process in accordance with claim 2, wherein sugar beets are cut into pieces and contacted with hot water to produce an extract of water soluble components and water insoluble pulp, the water insoluble pulp is then separated from the extract to form the water-extracted, sugar beet pulp.

4. A process in accordance with claim 3, wherein the water-extracted, sugar beet pulp is washed with water to remove foreign matter prior to the bleaching step.

5. A process in accordance with claim 3, wherein the bleached sugar beet pulp from step (b) is pressed to remove excess water.

6. A process in accordance with claim 5, wherein the bleach solution from step (b) and said press water are recycled as bleaching solution in step (a).

7. A process in accordance with claim 2, wherein hydrogen peroxide is the bleaching agent.

8. A process in accordance with claim 2, wherein the concentration of bleaching agent in the bleaching solution is from about 0.5% to 50% by weight, and the temperature of the bleaching solution is from about 20° C. to 90° C.

9. A stable, bland, free-flowing food supplement comprising bleached, water-extracted sugar beet pulp which has a chemical composition of about 4% to 8% by weight water, about 7% to 9% crude protein, about 15% to 25% crude fiber, about 60% to 70% nitrogen-free extracts, and about 2.5% to 5% ash.

10. A stable, bland, free-flowing, food supplement made in accordance with claim 1.

* * * * *